Patented May 30, 1950

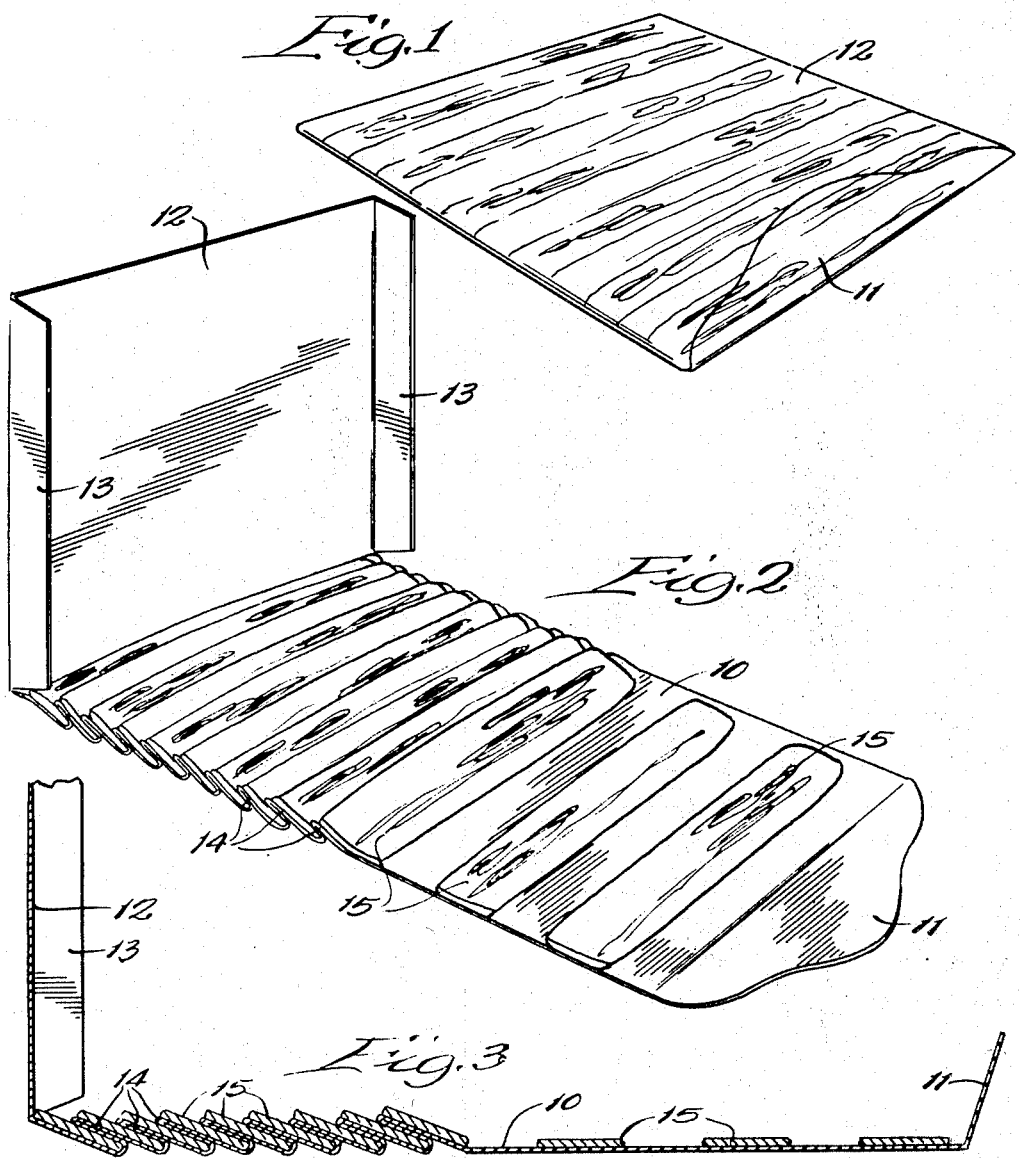

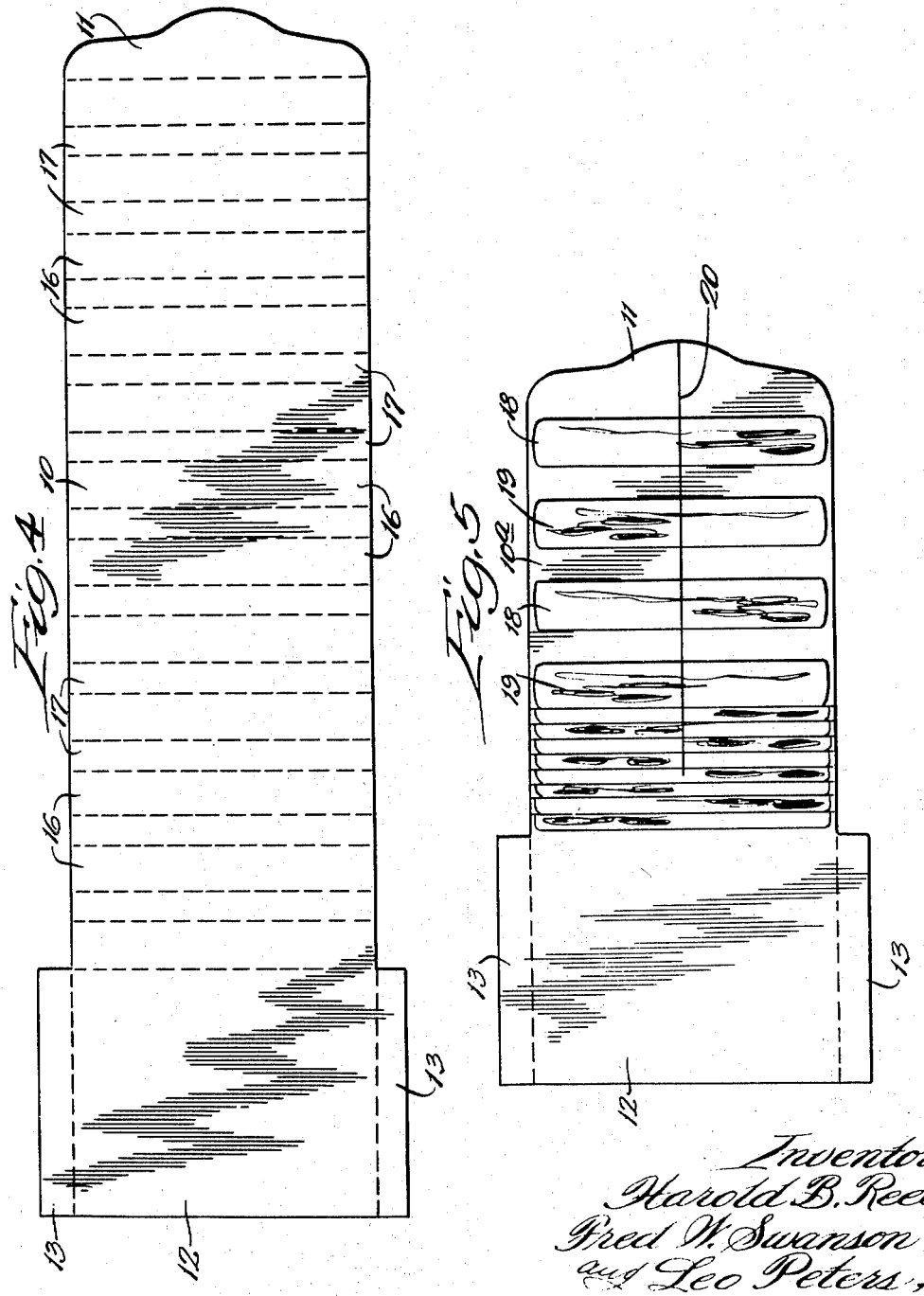

2,509,450

UNITED STATES PATENT OFFICE 2,509,450

BACON PACKAGE

Harold B. Reed, Chicago, Fred W. Swanson, Park Ridge, and Leo Peters, Evanston, Ill.; said Reed and said Peters assignors to said Swanson Application May 8, 1948, Serial No. 25,826

8 Claims. (Cl. 99—174)

This invention relates to a bacon package or to bacon packages and to methods for packaging bacon and the like.

The packaging of bacon slices has presented a serious problem for many years. The thinly sliced bacon is extremely difficult to pick up because of the thinness of the slice and its weak structure, and usually tears, destroying the appearance of the original slice. Further, the grease tends to cling to the fingers and is removed with considerable difficulty. In packaging the bacon, slices are ordinarily folded in partially overlapping relation and the slices tend to cling to each other with a tenacious grip which is often greater than the tensile strength of the slices. It is highly desirable that the bacon have the upper edge or front edge portion thereof exposed because these edges indicate the amount of lean meat in the slices. However, as above indicated, the adherence of the bacon slices to each other when arranged in this form or when stacked one upon the other, makes it extremely difficult to bring about a separation of the slices without tearing the slices and applying grease to the fingers of the housewife.

It is customary to sell bacon in relatively long slices and the package is later divided, half the bacon slices being sold to one customer and the other half to another. The bacon slices uniformly have a preponderance of lean meat on one side of the slice over that in the other half of the slice. Thus when the bacon package is divided in the butcher shop, it is found that one customer obtains a very desirable half of the bacon containing most of the lean meat while the other customer receives the very undesirable half of the bacon slices.

An object of the present invention is to overcome the above difficulties while at the same time displaying the bacon with the desired upper or front edges thereof exposed to view. A still further object is to provide a bacon package in which bacon slices are spaced from each other by the package walls to prevent adherence of the slices to each other while at the same time permitting the slices to be exposed when desired upon a flat sheet supporting the slices thereon in spaced relation so that they may be readily removed by a spatula or wide-bladed instrument. Yet another object is to arrange the bacon slices in a staggered arrangement with one slice having the preponderance of the lean meat on one side being followed by a bacon slice having a preponderance of the lean meat on the opposite side. A still further object is to provide a method of packaging and a bacon package in which bacon slices are supported upon a folded or pleated strip with the pleats lying between the bacon slices arranged in partially overlapping relation while providing a wrapper which encloses the bacon ends of the bacon slices. Other specific objects and advantages will appear as the specification proceeds.

The invention is illustrated, in single embodiments, by the accompanying drawings, in which:

Fig. 1 is a perspective view of a finished package; Fig. 2, a perspective view of a package partially opened; Fig. 3, a broken vertical sectional view of the partially opened package; Fig. 4, a top plan view of the package in extended or flat position with the spaces for the bacon slices indicated thereon; and Fig. 5, a plan view of the package with one end thereof partly drawn, the bacon slices being reversed so that each alternate slice is alike with respect to the lean meat content thereof and the package being arranged for cutting centrally along the severance line indicated.

In the illustration given in Figs. 1 to 4 inclusive, 10 designates an elongated strip equipped at one end with a tab 11 and at the other end with a wrapper portion 12. The wrapper portion 12 is preferably equipped with laterally extending flaps 13 for wrapping about the ends of the finished package. The strip 10 may be formed of any suitable material such as parchment type paper, cellophane and any other suitable material useful for the purposes described. As shown more clearly in Figs. 2 and 3, the web or strip 10 is folded upon itself to form pleats or folds 14 and which provide pockets for receiving the bacon slices 15. The bacon slices are arranged in a feathered or partially overlapping arrangement, as shown best in Figs. 2 and 3, with the front or lean edges of the bacon exposed to view.

In the packaging of the bacon, the bacon slices may, if desired, first be deposited upon the strip 10 in spaced relation and the strip 10 may then be grasped along the edges and folded as one slice is moved forwardly to form the staggered arrangement illustrated in Figs. 2 and 3. As shown best in Fig. 4, the spaces 16 between the dotted lines may receive the bacon slices and the space 17 there-between is utilized for the overlap. Thus by means of a slicing machine and traveling conveyor means, the slices may be placed in these locations upon the strip 10 as it is advanced and then either by machine or by hand, the slices may be stacked one upon the other with the accordion-like folds indicated. After the slices have all been stacked upon each other, the wrapper 12 may then be caused to envelope the finished package along the edges and the flap 11 may be turned over and, if desired, sealed against the package wall.

In the operation of the package or in the use of the package by the housewife, the tab 11 is freed and drawn forwardly to the position shown in Figs. 2 and 3. It will be noted that this action exposes several slices of bacon in separated or spaced relation, as shown best in Figs. 2 and 3.

The housewife may then, by means of a spatula, etc., remove a slice and deposit it in the frying pan. Since the slices have not contacted each other, there is no problem of tearing apart slices and preventing their breaking in two. Further, the spaced relation of the exposed slices makes it unnecessary for the housewife to touch the slices with her fingers.

After a desired number of slices have been removed, the empty end portion of the package may be folded back over the other slices and the package again closed and returned to the refrigerator.

While the opening procedure above described, in which the outer end of the package is first drawn to expose the outermost slices, may be used, the housewife may, if she wishes, draw the strip 10 at any point so as to separate slices at any selected area along the strip 10.

In the modification shown in Fig. 5, the strip 10a is provided with bacon slices 18 having the lean meat preponderating on one side and also with the bacon slices 19 in which the lean meat preponderates on the opposite side. It will be observed that the slices 18 and 19 are arranged in staggered arrangement in the formation of the finished package. The bacon package may, when desired, be severed along the median line 20 to form two packages each containing slices which have the same amount of lean meat therein. In other words, half of the package shown will have a bacon slice in which there is relatively little lean meat followed by a bacon slice in which there is a large amount of lean meat so that the purchasers of the divided package each obtain their fair proportion of the lean meat in the bacon slices.

In all of the structures illustrated, the strip 10 may be formed of the same material as the wrapper 12 or, if desired, it may be formed of a different type of material which is then attached to the wrapper 12. The strip 10 may be opaque, translucent or transparent. The wrapper 12, preferably transparent, renders the bacon slices visible but, if desired, it may be formed partially of opaque material with transparent windows therein for exposing the material. If desired, the wrapper 12 may be of relatively rigid material while the strip 10 may be of flexible material. Wide variation in the structures of the package walls may be made to meet different conditions of packaging, advertising, display, etc.

While in the foregoing specification, we have set forth specific structures in considerable detail for the purpose of illustrating the invention, such details of structure and arrangement may be modified widely without departing from the spirit of our invention.

We claim:

1. In a bacon package, an elongated flexible strip provided with spaced transverse folds in partially and freely overlapping relation and providing pockets adapted to receive bacon slices there-between to separate said slices, bacon slices in said pockets, the upper edge portions of the bacon slices being exposed.

2. In a bacon package, an elongated flexible strip provided with spaced removable transverse folds in partially and freely overlapping relation and providing pockets there-between, said pockets being adapted to receive bacon slices whose front edges are exposed but separated by the fold from the bacon slices there-below, bacon slices in said pockets, said strip when drawn at one end separating the folds and completely exposing the bacon strips on one side and in spaced relation on the drawn portion of the strip.

3. In a bacon package, an elongated flexible strip provided with spaced transverse free folds in partially overlapping relation and providing pockets adapted to receive bacon slices, bacon slices in said pockets, and a wrapper for enclosing the end portions of said bacon, said strip being adapted to be drawn to remove said folds.

4. In a bacon package, a rectangular flexible strip provided with transverse free folds in partially overlapping relation and providing pockets adapted to receive bacon slices whose front edge portions are exposed by said folds, bacon slices in said pockets and a wrapper connected to said strip and having side flaps for enclosing the end portions of the bacon, said strip being adapted to be drawn at one end to separate the overlapping folds.

5. In a bacon package, a rectangular flexible strip provided with spaced transverse folds in partially and freely overlapping relation providing pockets for receiving the bacon slices while exposing the upper edge portions thereof, bacon slices in said pockets, and a pull tab at one end of said strip, said tab when drawn tending to separate the folds adjacent thereto and to expose the bacon strips on one side in exposed relation on the drawn portion of the strip.

6. In a bacon package, an elongated flexible strip provided with spaced transverse folds in partially and freely overlapping relation and providing pockets adapted to receive bacon slices whose front edge portions are exposed, bacon slices in said pockets, and a transparent wrapper having side flaps for enclosing the end portions of the bacon, said strip when drawn at one end tending to separate the folds and to expose the bacon strips in spaced relation on the drawn portion of the strip.

7. In a bacon package, an elongated flexible strip having spaced transverse folds in partially and freely overlapping relation, bacon slices between said folds and alternately arranged with a bacon slice having a preponderance of lean meat on one side being in juxtaposition to a bacon slice having a preponderance of the lean meat on the opposite side, and a wrapper integral with said strip for enclosing the end portions of said bacon.

8. In a bacon package, an elongated flexible strip provided with spaced transverse folds in partially and freely overlapping relation, and providing stepped pockets adapted to receive bacon slices with their front edge portions exposed, bacon slices in said pockets, said strip having a pull tab end adapted to be grasped and drawn while said strip is held at an intermediate point to expose the bacon strips on an unfolded portion of the strip without disturbing the remaining folds of the strip.

HAROLD B. REED.
FRED W. SWANSON.
LEO PETERS.

REFERENCES CITED

The following references are of record in the file of this patent:

UNITED STATES PATENTS

| Number | Name | Date |
| --- | --- | --- |
| 1,021,598 | Harrington | Mar. 26, 1912 |
| 1,375,479 | Van Allen | Apr. 19, 1921 |
| 1,711,372 | Carter | Apr. 30, 1929 |
| 2,210,196 | Baldwin | Aug. 6, 1940 |